Patented Jan. 2, 1945

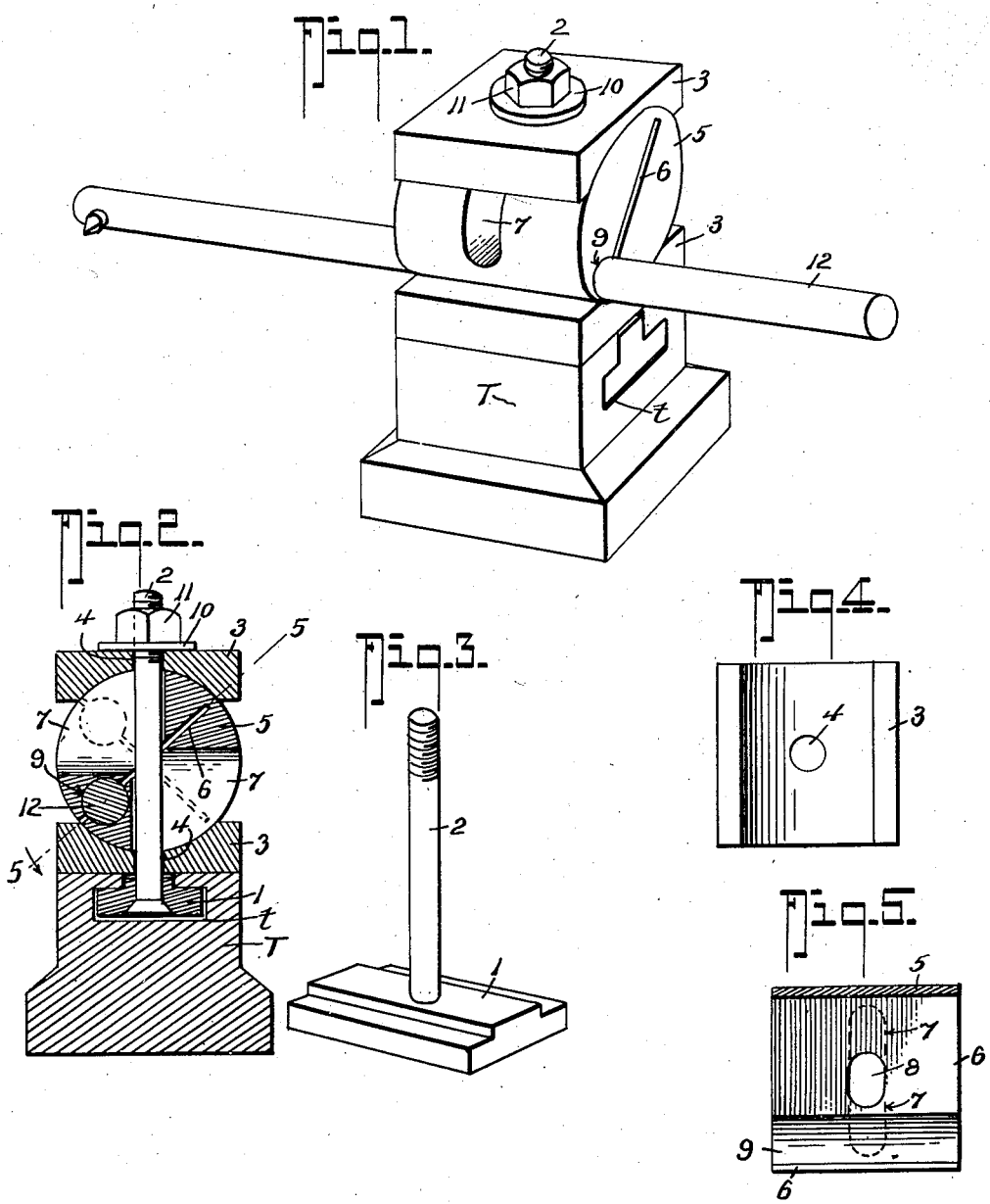

2,366,370

UNITED STATES PATENT OFFICE 2,366,370

BORING BAR HOLDER

George E. Terwilliger, Los Angeles, Calif., assignor to Welch Tool Engineering Company, Los Angeles, Calif.

Application May 29, 1944, Serial No. 537,859

2 Claims. (Cl. 82—36)

My invention relates to tool holders, more particularly to boring bar holders and it primarily has for its object to provide a holder of an improved construction wherein the boring bar is always held parallel to the axis of the lathe so that it does not tip.

A further object is to provide an improved boring bar holder in which a single bolt and nut serves to secure the holder on the tool post of a lathe and at the same time serves to secure the boring bar in position for effective use.

Other objects will in part be obvious and in part be pointed out hereinafter.

To the attainment of the aforesaid objects and ends the invention further resides in those novel details of construction, combination and arrangement of parts all of which will be fully described hereinafter and then be specifically pointed out in the appended claims, reference being had to the accompanying drawing in which:

Figure 1 is a perspective view of my invention mounted on a tool post of any approved construction.

Figure 2 is a central vertical cross section of the same.

Figure 3 is a perspective view of the clamping bolt.

Figure 4 is a plan view of one of the clamping plates.

Figure 5 is a detail section of the bar retainer taken on the line 5—5 of Figure 2.

In the drawing in which like numerals and letters of reference indicate like parts in all the figures, 1 represents the elongated head of the clamping bolt 2. The bolt 2 passes through center holes 4 in a bottom and in a top clamping plate 3. Each plate 3 has a cylindrical surface portion on one face and is flat on the opposite face.

A cylindrical bar retainer 5 has a passage 8 for the bolt 2 and transverse slots 7. The cylinder is also slit longitudinally in a plane (as at 6) that intersects the axis of the retainer 5. The plates 3 have their cylindrical surfaces opposite each other and the retainer 5 is held between the pair of plates 3 as shown in Figures 1 and 2.

The bar retainer has a longitudinal opening 9 to receive the boring bar 12. A washer 10 and nut 11 completes the assembly.

The holder, composed of the parts 1 to 11 inclusive, can be swivelly adjusted about the axis of the bolt 2 and the boring bar can be bodily adjusted up or down about the axis of the bar retainer. The tool post of the lathe is indicated by T and per se is not my invention.

From the foregoing description taken in connection with the accompanying drawing it is thought that the construction, operation and advantages of my invention will be clear to those skilled in the art.

What I claim is:

1. A boring bar holder, comprising: upper and lower clamping plates each having a flat face and a semicylindrical face, the semicylindrical faces being opposed to one another; a cylindrical bar retainer held between said plates; a clamping bolt having a head to enter the T-slot of a tool post and passing through holes in said plates and in said bar retainer, the bar retainer lying with its axis intersecting and normal to the axis of said bolt; and a clamping nut and washer on the bolt for securing the bar retainer between the clamping plates, said bar retainer being longitudinally split and having a bar-receiving opening intersected by said split.

2. A boring bar holder for mounting on a tool post having a T-slot; said holder comprising an upper and a lower clamping plate having opposed semicylindrical surfaces and having transverse bolt holes; a cylindrical bar retainer lying between said clamping plates, said bar retainer having a transverse bolt hole and bolt receiving slots merging with said last named bolt hole, said bar retainer having an offset boring-bar-receiving hole extending parallel to the axis of the bar retainer, said bar retainer being longitudinally split, the split intersecting said boring-bar-receiving hole and said bolt hole of the retainer; a bolt having a head to fit the T-slot of the tool post and passing through said bolt holes; and a clamping nut on said bolt for securing the parts of the bar holder assembled on the tool post and securing a boring bar in said boring-bar-receiving hole.

GEORGE E. TERWILLIGER.